United States Patent [19]

Battaglia

[11] Patent Number: 4,848,218
[45] Date of Patent: Jul. 18, 1989

[54] MACHINE FOR MAKING RAVIOLI HAVING AN IMPROVED FILL MECHANISM

[76] Inventor: John M. Battaglia, 440 N. Taylor Ave., South Hackensack, N.J. 07606

[21] Appl. No.: 214,943

[22] Filed: Jul. 1, 1988

[51] Int. Cl.⁴ .................... A21C 9/00; A23P 1/00
[52] U.S. Cl. .................... 99/450.7; 99/450.2; 99/450.6; 425/112; 425/115
[58] Field of Search .............. 99/450.1, 450.2, 450.6, 99/450.7, 450.8; 425/112, 115, 122, 448, 511, 512, 515, 518, 327, 362

[56] References Cited

U.S. PATENT DOCUMENTS

| | | | |
|---|---|---|---|
| 1,844,142 | 2/1931 | Barili | 99/450.2 |
| 2,001,792 | 5/1935 | Lombi | 99/450.2 |
| 2,227,728 | 1/1941 | Lombi | 99/450.2 |
| 2,774,313 | 12/1956 | Lombi | 99/450.2 |
| 2,905,105 | 9/1959 | Lombi | 99/450.6 |
| 3,373,702 | 3/1968 | Quilici et al. | 99/450.5 |
| 3,605,641 | 9/1971 | Shuster | 99/450.7 |
| 4,160,634 | 7/1979 | Huang | 99/450.6 |

Primary Examiner—Timothy F. Simone
Attorney, Agent, or Firm—Anthony Lagani, Jr.

[57] ABSTRACT

This invention relates to a ravioli making machine. In particular, it relates to an improved method of feeding filler material to a dough lined cavity. The novel feeder tube of this invention is adapted to be utilized with the ravioli machine which has been marketed in the past.

9 Claims, 3 Drawing Sheets

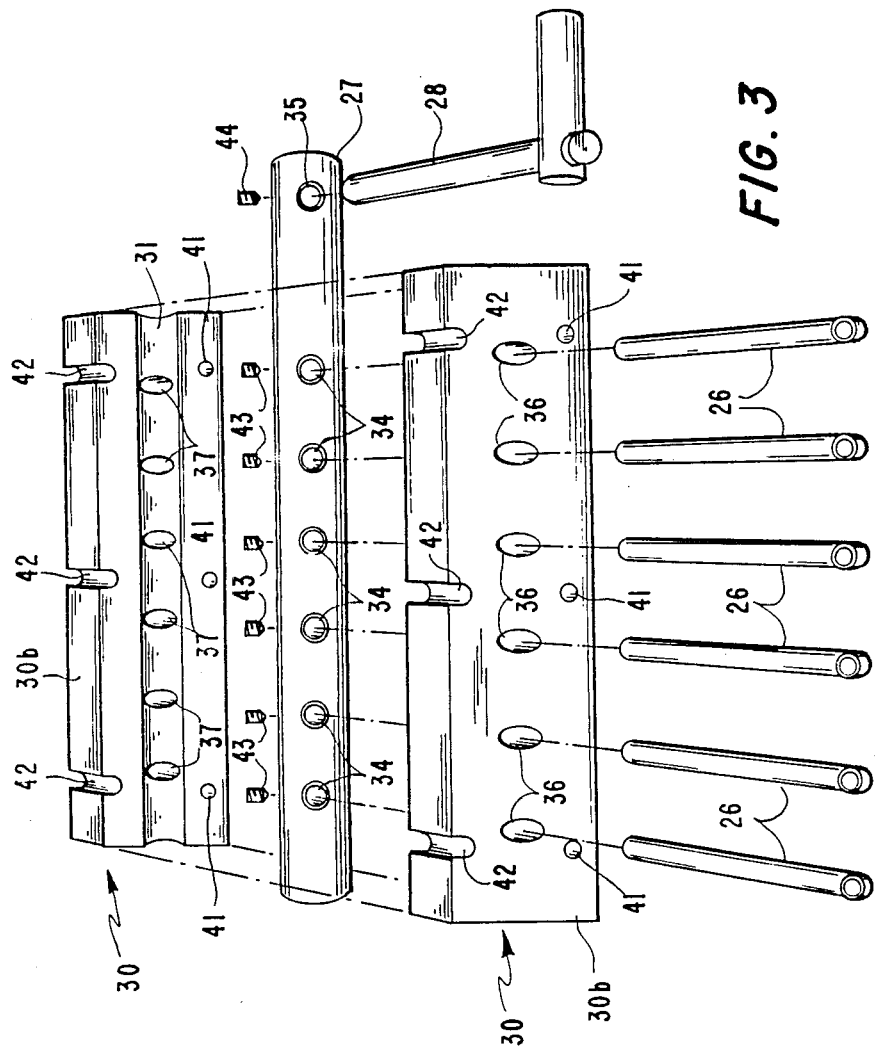

MACHINE FOR MAKING RAVIOLI HAVING AN IMPROVED FILL MECHANISM

FIELD OF INVENTION

This invention relates to a machine for producing ravioli. In particular it relates to a improved method for feeding filling onto a prepared sheet of dough.

BACKGROUND OF THE INVENTION

Machines for automatically forming pastry and other dough products are well known in the art. U.S. Pat. No. 3,930,441, discloses a method of preparing a baked dough sheet. Dough contained in a hopper is fed using a gear pump through a flat nozzle onto a rotating drum. The drum is heated and the dough is baked on it.

U.S. Pat. No. 2,073,731 discloses a device for intermittently ejecting measured quantities of material, i.e., pie filling, to a pie pan containing dough. The apparatus comprises a delivery pipe having a discharge nozzle, a swivel joint connecting the delivery pipe to the outlet of the device and means for raising the delivery pipe after each discharge so that the material deposited is separated from the material remaining in the nozzle.

U.S. Pat. No. 1,844,142, discloses an apparatus for making stuffed pastry, such as ravioli, filled confectionery and other similar products. The invention disclosed comprises a pair of rolls one of which has pockets to accept filling as well as having cutting edge which cut the dough in a direction axial to the roll. The other roll has spaced apart cutters parallel to one another which are perpendicular to the axis of the roll. The cutters on each roll are spaced so that when the two rolls engage one another the dough which has been fed into the rolls is sealed and cut. Two separate pieces of dough are fed into the nip of the rolls one over each roll. The filling is introduced from a hopper which fits into the roll nip. No control is provided to measure out a specific quantity of filler other than the size of the cavity. Filling can cover the outer edges of the pastry or ravioli which results in 'leakers' which must be discarded.

U.S. Pat. No. 2,001,792, to Lombi discloses a ravioli machine. The machine comprises a pair of dough hoppers and a hopper to contain filling, centrally located between the dough hoppers. Sheeting means are provided to form a sheet from dough exiting each dough hopper. The two sheets of dough are fed between two rolls one of which is provided with cavities to accept filling. The filling hopper is provided with a vertical discharge shute for feeding filler into the throat (nip) of the rolls between opposing dough sheets. Means are provided associated with the hopper to intermittently feed a measured quantity of filling into the cavities.

U.S. Pat. No. 2,774,313, to Lombi discloses a ravioli making machine similar to that described in the above referenced U.S. Pat. No. 2,001,792. The improvements disclosed include means for sucking dough into the cavities, and a filler material nozzle which is shaped to fit into approximately the curvature of the cavities in a die roll. The feed nozzle is vertical and moves in a vertical direction away and toward the layer of dough covering the die roll. This machine uses an intermittent feed motion for feeding of the dough sheet. As a consequence the machine has a low production capacity. MBC Food Machinery Corporation has made and sold a ravioli making machine comprising two dough hoppers, a centrally located filler hopper and means for forming dough sheets which are fed over rolls, one of which is provided with cavities. At least one feeder tube is provided in order to feed a measured amount of filler intermittently to each cavity. The MBC machine is similar in operation to the machine described in U.S. Pat. No. 2,774,313, but the MBC machine feeds the dough sheet continuously rather in the intermittent stop and go manner of the Lombi U.S. Pat. No. 2,774,313 machine. However, no vacuum is used to bring the dough into the cavity, and the feed tube is stationary. Additionally, the feed tube addresses the die roll at a location to the side of the roll at about the centrally located horizontal diameter of the die roll. Filler material is pumped by means of a gear pump intermittently into each cavity as the dough passes the feed tube. The two sheets of dough are sealed in the nip, and are subsequently cut into individual and circumferentially spaced cutters. Wile the MBC machine has met with substantially greater success than the Lombi machine described in U.S. Pat. No. 2,774,313, it suffers from a problem associated with all prior art ravioli machines. There is a tendency for the filler to drip and coat the dough in areas where it is intended to seal the individual ravioli. The result is that 'leakers' are occasionally made which must be discarded. Neither the filler, nor the dough is salvageable.

What is needed is a method which permits the filler material to be fed to the dough cavities while at the same time avoiding dripping of filler material onto the sealing edges of the ravioli.

SUMMARY OF THE INVENTION

It has surprisingly been found that dripping of filler material during feeding of filler material to a die cavity over which is laid a sheet of dough can be prevented by utilizing side feeding of the filler and rapidly withdrawing the feeder tube from the cavity area. The feeder tube is mounted on a journal and moved in an oscillating manner to move the feeder tube away from and toward the dough sheet. As the journal oscillates on its axis an inlet port at the top of the feeder tube alternately opens and closes, permitting filler material to be intermittently fed by a gear pump to filler tube for delivery to the mold cavity.

DESCRIPTION OF THE DRAWINGS

FIG. 3 shows details of the feed tube and mounting block.

DETAILED DESCRIPTION OF THE INVENTION

This invention relates to a ravioli making machine. In particular, it relates to an improved method of feeding filler material to a dough line cavity. The novel feeder tube of this invention is adapted to be utilized with the ravioli machine which has been marketed in the past and continues to be marketed by MBC Food Machinery Corporation. That machine is described in detail below.

Figure 1:
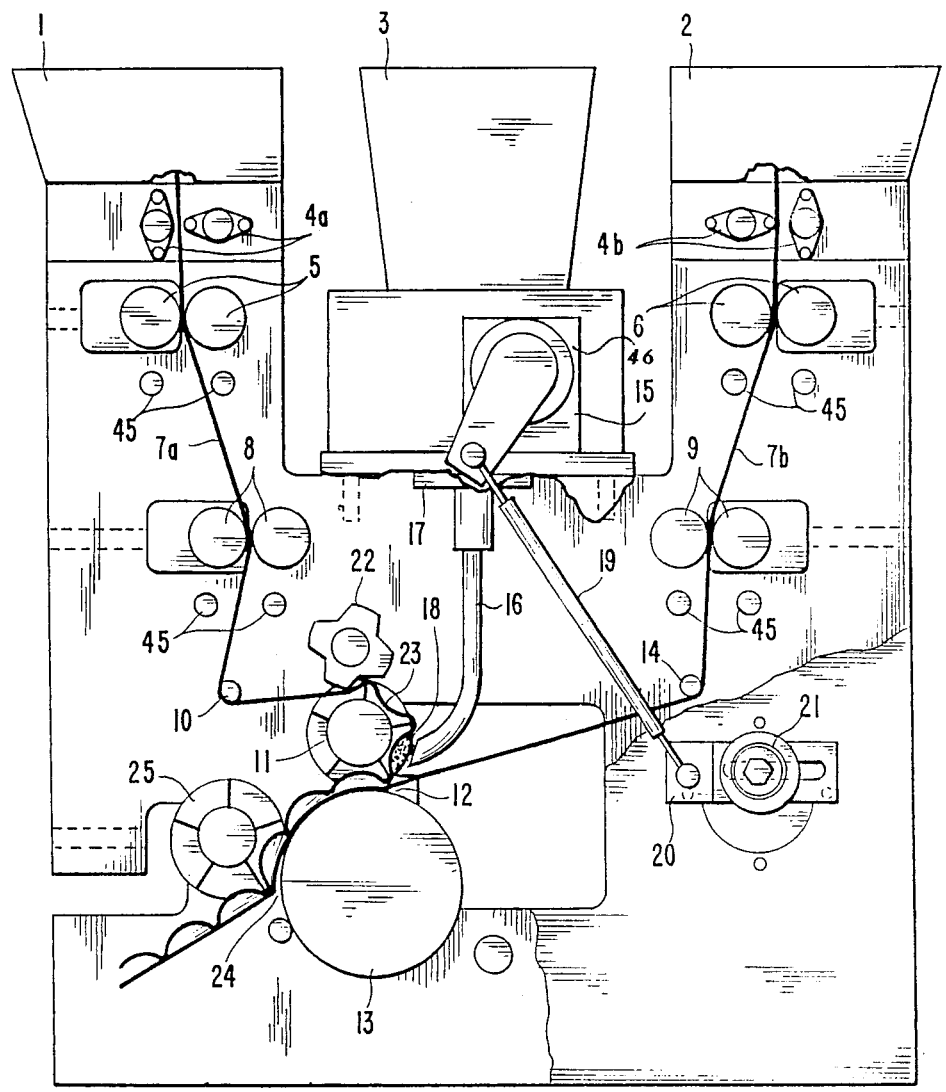
FIG. 1 shows a prior art ravioli machine with a side feed tube.

Referring now to FIG. 1, the prior art ravioli machine of MBC Food Machinery Corporation is shown. The ravioli machine comprises two dough hoppers, 1, and 2, between which is located a filler material hopper, 3. Chunks of unformed dough are fed through neader bars, 4a, and 4b. b. Associated with each dough hopper are a pair of primary forming rolls, 5, and 6, which rough forms the dough into a sheets, 7a, and 7b, which is then fed to secondary forming rolls, 8, and 9, which size the dough sheets, 7a and 7b, to the proper thickness. The dough sheet, 7a, from hopper, 1, is fed around a tension idler, 10, over the top of the female die roll, 11, and around the die roll, downwardly to a nip, 12, formed by the female die roll, 11, and a drum roll, 13 located directly below the die roll, 11. The dough sheet, 7b, from dough hopper, 2, is fed through the secondary forming rolls, 9, around tension idler, 14, and into the nip, 12.

At the outlet of the filler material hopper, 3, is a gear pump, 15, which intermittently feeds filler material in measured amounts to feed tube, 16. Feed tube 16, is rigidly mounted in a fixed position in mounting block, 17. It can, however, be moved by use an adjustment means (not shown) to vary the spacing between the die roll, 11, and the feed tube outlet, 18. Male preforming die, 22, presses the dough sheet, 7a, into a pocket, 23, in the die roll, 11. The gear pump is actuated by means of a pivotably mounted shaft, 19, driven by an adjustable, slotted holder plate, 20, mounted on an eccentric, 21. THE SHAFT, 19, IS CONNECTED TO A RATCHETED ONE WAY ·CLUTCH, 46, WHICH CAUSES THE GEAR PUMP TO TURN IN ONLY ONE DIRECTION.

After filler material has been fed into the pocket, 23, of the die roll, 11, the two dough sheets with filler material proceed through nip, 12, where the individual ravioli is shaped and sealed. The sealed and filled dough sheets then proceed through a second nip, 24, formed by drum roller, 13, and cutting die, 25, where the sheet is scored so that each individual ravioli can be readily removed from the sheet. The sheet then falls onto a conveyer belt (not shown) for delivery to a remote processing area for further processing, e.g., freezing and packaging. The ravioli can be of any suitable shape, e.g., square, round, elliptical, etc. The die cavity, of course, will be shaped to conform to the desired ravioli configuration. Similarly, the cutting surfaces of the die roll will conform the the die roll cavity configuration. Scraper knives, not shown, are mounted on bars inserted into holes, 45, and serve to continuously scrape any dough build-up from rolls 5, 6, 8 and 9.

The positioning of the die pocket and feed tube must be coordinated with the actuation of the gear pump to ensure that filler material is delivered to a die pocket, 23. The timing of all functions of the machine is controlled by chain and sprocket gearing (not shown). A single drive motor, not shown, drives all of the rollers through sprocket and chain drives. The positioning and timing of the various gears is within the skill of those in the machinery art.

Ordinarily with thick, high viscosity filler material the prior art machine will function as it is intended to operate. However, when the filler material is loose or runny, dripping can occur because the filler material in the cavity tends to remain attached to filler material in the feed tube. The consequence is that filler material is deposited on the sealing area of the ravioli, thereby jeopardizing the integrity of the seal. As a result, the ravioli if used could come apart or lose filler material during the handling or cooking process. Since the consistency of filler material will depend on the formulation utilized by a particular ravioli manufacturer as well as batch to batch variations in filler material, it is desirable to have a fill mechanism which works without substantial rejection of product as a result of dripping regardless of the consistency of filler material. Notwithstanding the fact that the ravioli machine described in U.S. Pat. No. 2,774,313, utilizes a vertical fill tube which moves in a vertical direction away from and toward the ravioli pocket being filled, dripping still occurs. The feed mechanism of this invention overcomes the prior art problem of dripping.

Figure 2:
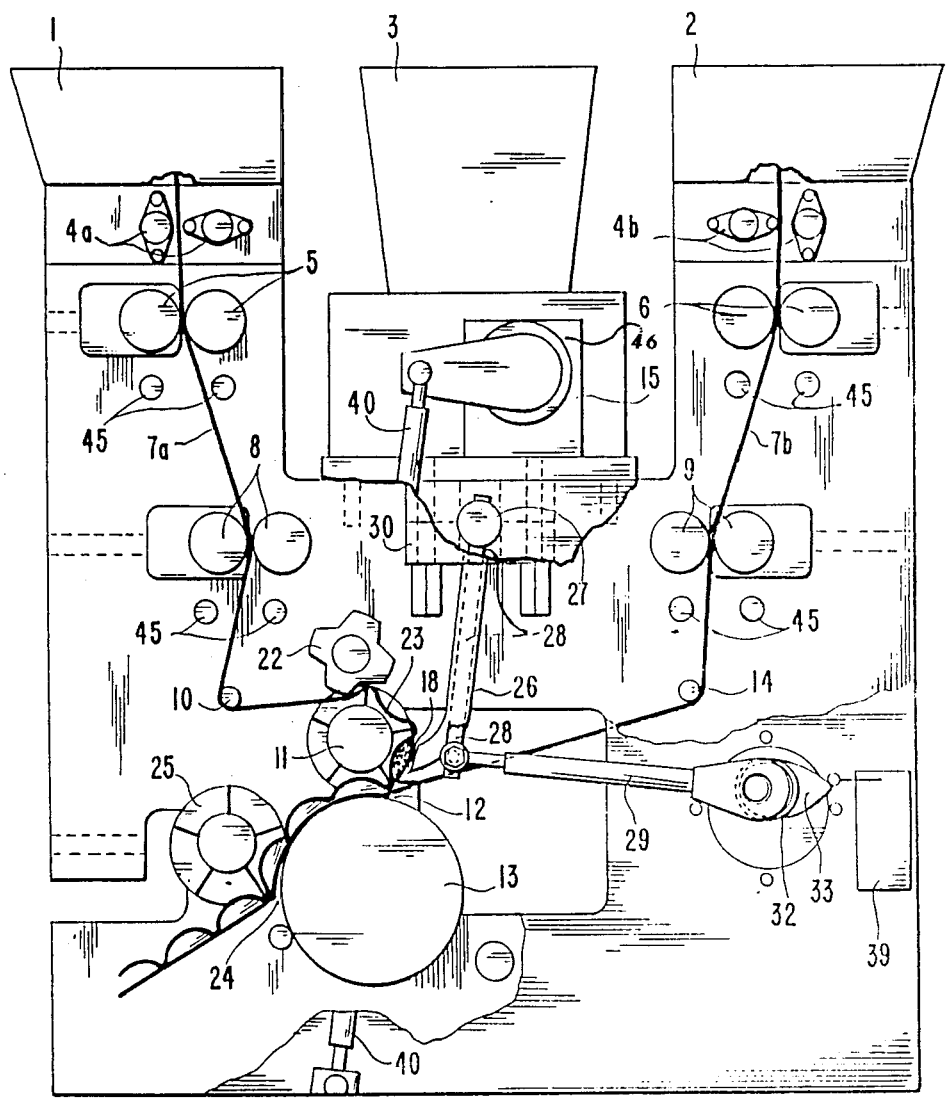
FIG. 2 shows the ravioli machine of this invention with its improved feed tube.

Referring now to FIG. 2, all identically numbered parts are the counterparts of the parts shown in FIG. 1. The feed tube, 26, is rotatably mounted on a journal, 27. The journal can be turned by means of pivot rod, 28. However, since the motion of the pivot rod is limited by cam follower rod, 29, the motion of the journal is limited to a back and forth oscillating motion. The mounting block, 30, is adapted with a support bearing surface, 31, in which the journal moves.

The follower rod, 29, rides on cam, 32, which causes an oscillating motion of the follower rod, 29, which is transmitted to the journal, 27, through the pivot rod, 28. Since both cam, 32, and cam, 33, are mounted on the same shaft, the cams can be adjusted with respect to one another so as to coordinate the positioning of the feed tube, 26, and the activation of the gear pump, 15. The gear pump is actuated by means of an air motor (not shown), the motor being energized by the tripping of switch, 39, by a cam, 33. The gear pump, 15, is driven by means of push rod, 40, which is connected to the air motor.

While the air supply for the air motor can be intergral with the machine it is preferred that a separate high pressure air source be used. Only the air filter, pressure regulator and lubricator for the motor are mounted on the frame with the drive motor and the remainder of the machine.

Both FIGS. 1 and 2 are cut-away views wherein portions of the cover plate of the machine have been cut away to expose the internal working of the machine.

In a preferred embodiment the block and journal are made of Delrin ® a polyethylene/acrylic acid ionomerically crosslinked graft polymer. Using that material of construction no special bearing, or lubrication is required. An equally usefully material of construction for the journal and mounting block is polyamide resin, i.e. nylon ®. The advantage of not having to lubricate parts is that one source of food contamination is avoided. Furthermore, the use on non-metal parts avoids the possibility of chips of metal getting into the food product.

Referring now to FIG. 3, a detail of the feed mechanism is shown where the mechanism comprises a multiplicity of feed tubes. The journal, 27, is provided with six feed ports, 34, to accept feed tubes, 26 which are secured by set screws, 43. A hole, 35, located at one end of the journal, 27, accepts the pivot rod, 28, which drives the journal, 27. The pivot rod, 28, is secured to the journal my means of a set screw, 44. the mounting block, 30, comprises two halves which are mirror images of one another. Each half has a molded in bearing surface, 31, to support the journal, 27. The elliptical holes, 36, in the bottom half of the block, 30a, permit the feed tubes 26 to pass through and oscillate to the required extent without obstructing the motion of the feed tube, 26. Similarly, filler material can pass through elliptical holes, 37, located in the top half of the block, 30b. The block, 30, are held together by bolts passing through holes, 41, and slots, 42, which simultaneously secure the block, 30 to the machine frame in juxtaposition with the gear pump, 15.

The combination of horizontal side feeding of filler material and withdrawal of the feed tube from the die roll area after filler material discharge results in a high speed dripless fill operation. the use of Delrin ® as the material of construction for the mounting block, 30, and the journal, 27, eliminates both the need for potentially food contaminating lubrication and the possibility of metal particles entering the food being processed.

While the invention has been described in terms of a fill mechanism for a ravioli machine, it will be appreciated by those skilled in the art having access to this disclosure the the fill mechanism of this invention can be used to make a variety of filled pastry, including confectionery, peroggi, etc.

What is claimed is:

1. A ravioli machine comprising a filler material hopper centrally located between two dough hoppers, means for sheeting dough exiting each dough hopper; a female die roll having molds for forming the ravioli, a drum roll in juxtaposition with the die roll and spatially oriented so as to be displaced vertically from the die roll, means for feeding a first dough sheet into a nip formed by the die roll and the drum roll, said first dough sheet being fed into the nip after passing over the die roll; means for feeding a second dough sheet into the nip; fill means for feeding a filler material via a gear pump from the filler hopper into a dough lined cavity formed in the die roll, said first and second dough sheets being sealed one to the other by passing the sheets through the nip; said fill means comprising:
   (a) A journal having at least one feed hole therethrough;
   (b) A mounting block having a bearing surface to accept said journal;
   (c) at least one feed tube having a feed end for accepting a filler material from the gear pump and a discharge end, the feed end being substantially straight in relation to the length of the tube and the discharge end being bent at an oblique angle to an axis running the length of the fill tube, the feed end of said feed tube being inserted into the feed hole of the journal and secured therein;
   (d) means for oscillating the journal so as to move the discharge end of the feed tube away from and toward the die roll; and
   (e) means for coordinating the discharge of filler material from the feed tube with the
   spatial orientation of the position of the feed tube at the point of discharge, and the location of a cavity in the die roll so as to discharge filler material into a dough lined cavity;
   the filled and sealed dough sheets being subsequently advanced out of the roll nip area for further processing.

2. The ravioli machine according to claim 1 wherein cutting means is provided for cutting the filled sealed sheets of dough into separate ravioli.

3. The ravioli machine according to claim 2 wherein the cutting means comprises a cutting roll having cutting surfaces in the axial and radial directions said cutting surfaces being spaptially oriented so that their intersections define individual ravioli pieces, said cutting roll being juxtaposed to form a second nip with the drum roll, said filled and sealed dough sheets being fed through said second nip.

4. The ravioli machine according to claim 2 wherein the cutting means comprises a cutting roll having cutting surfaces shaped to conform to the shape of the ravioli formed in the die roll, , said cutting roll being juxtaposed to form a second nip with the drum roll, said filled and sealed dough sheets being fed through said second nip.

5. The ravioli machine according to claim 1 wherein a multiplicity of feed tubes are utilized.

6. A fill mechanism for feeding filler material to a pastry sheet which is in contact with a die roll comprising:
   (a) a journal having at least one feed hole therethrough;
   (b) a mounting block having a bearing surface to accept said journal;
   (c) at least one feed tube having a feed end for accepting a filler material and a discharge end through which filler material can be discharged, the feed end being substantially straight in relation to the length of the tube and the discharge end being bent at an oblique angle to an axis runnng the length of the feed tube, the
   feed end of said feed tube being inserted into the feed hole of the journal and protruding through a lower face of the mounting block;
   (d) means for oscillating the journal so as to move the discharge end of the feed tube away from and toward the die roll; and
   (e) means for coordinating the discharge of filler material from the feed tube with the spatial orientation of the position of the feed tube at the point of dishcarge, and the location of a cavity in the die roll so as to discharge filler material into a dough lined cavity in the die roll.

7. The fill mechanism according to claim 6 wherein filler material is fed to the feed tube by means of a gear pump.

8. The feed mechanism according to claim 6 wherein the means for oscillating the the journal comprises a cam driven cam follower rod, swivel mounted to a pivot rod, said pivot rod being inserted and secured in a radial hole located in an end of the journal.

9. The fill mechanism according to claim 6 wherein a multiplicity of feed tubes are utilized.

* * * * *